Oct. 11, 1966 L. T. FLEMING 3,278,919
CAPACITIVE BRIDGE TRANSDUCER SYSTEM
Filed June 18, 1962
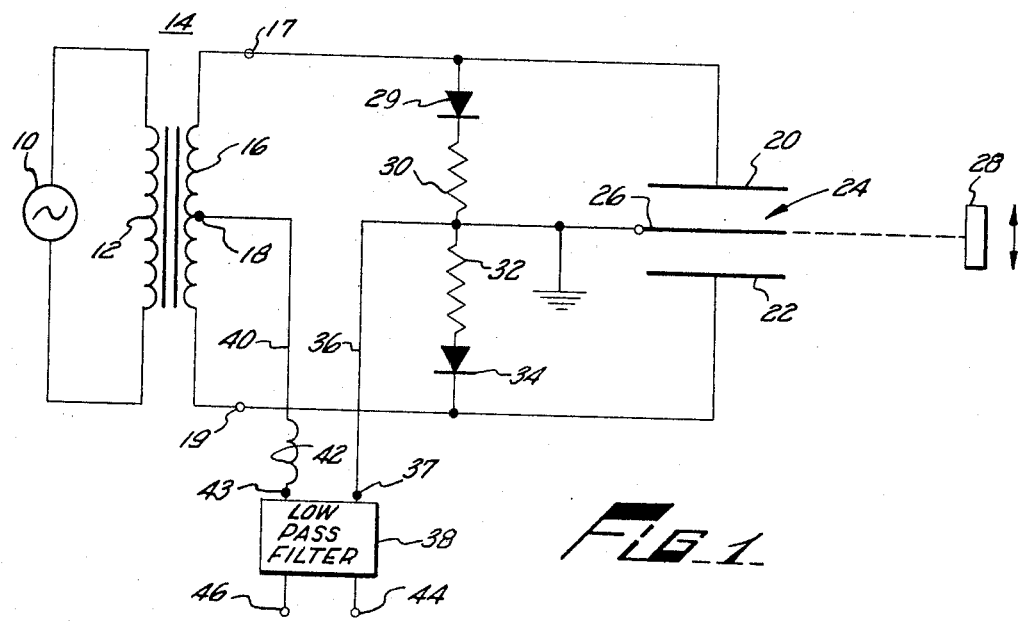
FIG_1_
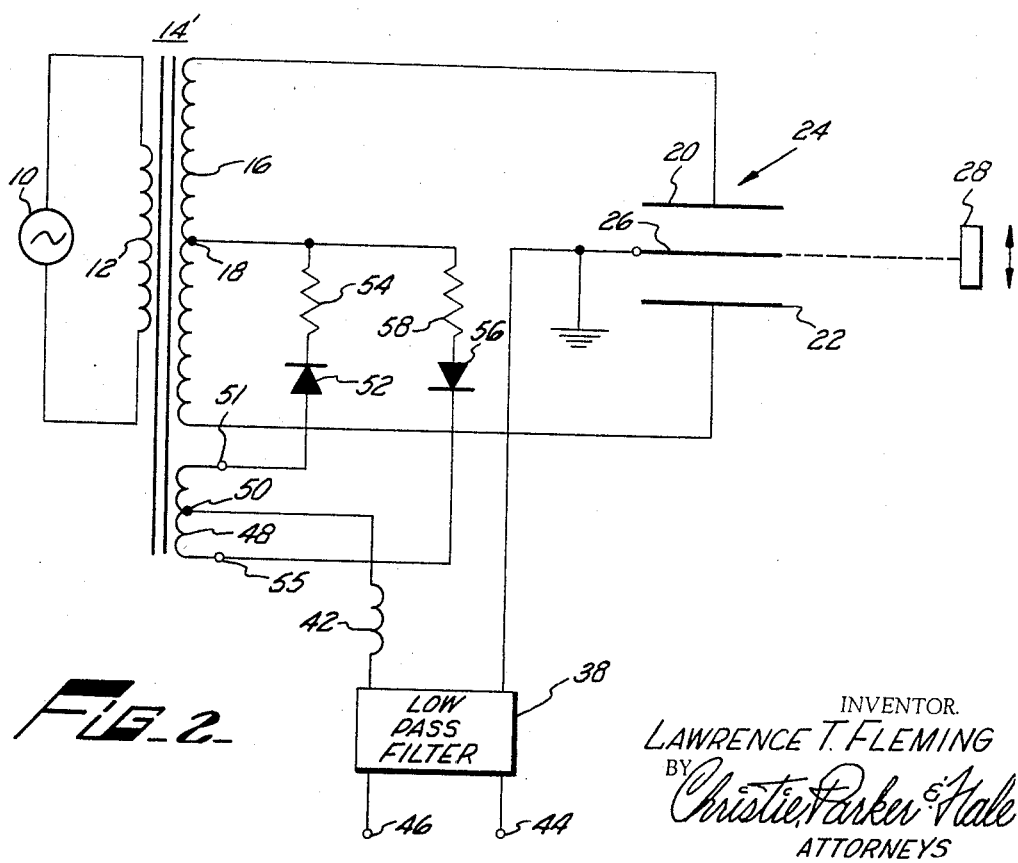
FIG_2_
INVENTOR.
LAWRENCE T. FLEMING
BY Christie, Parker & Hale
ATTORNEYS United States Patent Office 3,278,919
Patented Oct. 11, 1966

3,278,919
CAPACITIVE BRIDGE TRANSDUCER SYSTEM
Lawrence T. Fleming, Pasadena, Calif., assignor to Consolidated Electrodynamics Corporation, Pasadena, Calif., a corporation of California
Filed June 18, 1962, Ser. No. 203,125
12 Claims. (Cl. 340—200)

The present invention is directed to improvements in electromechanical transducers and, more specifically, to a novel transducer circuit which is particularly adaptable to use in detecting changes in the position of a movable member, object, or substance.

In many industrial systems it is desirable to detect, from a central checking station, changes occurring in the position of a movable member, object, or substance located at a remote test area. This is generally accomplished by providing a plurality of electromechanical transducers at the test area which are coupled to respond to movement of the movable member or substance. Changes in the position of the member or substance are sensed by the transducers and converted into direct current signals which are, in turn, transmitted to the central checking station.

Common types of sensors employed in detecting changes in the position of a movable member or substance include differential transformers and other variable-inductance devices, photoelectric sensors, and capacitive displacement sensors. Of the above group the capacitive displacement sensor possesses distinct advantages in design and operation. Since the capacitance of the sensor depends only on the geometry of a set of electrically conductive surfaces, the capacitive displacement sensor is simple and rugged in design and is extremely accurate in detecting changes in the position of an object or substance operatively coupled to one of its conductive surfaces.

In the past, however, the use of capacitive displacement sensors has been limited. This has been primarily due to the complicated electronic circuitry generally associated with capacitive displacement sensors to provide a complete transducer unit. The electronic circuitry, in addition to being relatively complex, has required frequent adjustment and has rendered the overall transducer unit more expensive than other transducer units of the types previously mentioned.

In view of the above, the present invention provides a transducer circuit which is particularly adaptable to use with a capacitive displacement sensor and together therewith provides a simple, compact, inexpensive, rugged and extremely accurate transducer unit for converting movement of a member or substance into D.C. voltage signals.

Briefly, to accomplish the above, the present invention, in one form, comprises a normally balanced bridge circuit including first and second impedance elements of equal value connected in series and a differential capacitor having first and second fixed plates and a movable central plate. The first and second fixed plates of the capacitor are coupled to the first and second impedance elements, respectively, while the movable plate is coupled to respond to changes in the position of a movable member or substance. Signal generating means are included for developing A.C. voltage signals across the first and second impedance elements which are of opposite phase and equal in amplitude when the movable plate is centrally disposed between the first and second fixed plates. A junction of the first and second impedance elements and the movable plate are coupled to first and second output terminals, respectively, of the transducer unit. One of the output terminals is coupled to a source of reference potential such as ground, while A.C. voltage signals at the other output terminal are demodulated by means operating in synchronism with the signal generating means to develop a direct current signal between the output terminals.

In one form of the present invention the means for demodulating alternating current signals includes a switching means coupled in series with the other output terminal and connected to open and close in synchronism with the signal generating means.

In another form of the present invention the demodulating means includes a pair of switching means connected to open and close simultaneously and in synchronism with the signal generating means. The first switching means is coupled between the first fixed plate and the movable plate while the second switching means is coupled between the movable plate and the second fixed plate.

In both embodiments, the switching means effect a synchronous demodulation of the A.C. voltage signals appearing at the other output terminal to provide a D.C. voltage signal between the output terminals which is directly proportional to movement of the movable member or substance coupled to the central movable plate of the differential capacitor.

The above, as well as other features of the present invention, may be more clearly understood by reference to the following detailed description when considered with the drawings, in which:

FIGURE 1 is a schematic, block diagram representation of one form of the present invention; and FIGURE 2 is a schematic, block diagram representation of a second form of the present invention.

Referring to FIGURE 1, the present invention, in one form, includes a source of alternating current signals 10 having its output coupled to the primary winding 12 of a transformer 14. The secondary winding 16 of the transformer 14 is center tapped as represented at 18. Coupled to opposite terminals 17 and 19 of the secondary winding 16 are fixed plates 20 and 22, respectively, of a differential capacitor 24. The differential capacitor 24 also includes a movable central plate 26 which, as illustrated, is coupled to a movable member 28. Movement of the movable member 28 produces movement of the plate 26 to change the capacitance between the fixed plate 20 and the movable plate 26 and between the fixed plate 22 and the movable plate 26 in an inverse manner. Such a differential capacitor and the operation thereof is described in detail at pages 66–70 of Instrumentation in Scientific Research, published in 1959 by McGraw and Hill.

Coupled in series between the fixed plate 20 and the movable plate 26 and between the movable plate 26 and the fixed plate 22 are a pair of switch elements. The switch elements effect a synchronous demodulation of D.C. voltage signals in the transducer unit in a manner hereinafter described. By way of example only, the switching elements include a diode 29 and a current limiting resistor 30 coupled in series between the fixed plate 20 and the movable plate 26 and a current limiting resistor 32 and a diode 34 coupled between the movable plate 26 and the fixed plate 22. The diodes 29 and 34 are connected for series current flow, the cathode of diode 28 being coupled through resistor 32 to the anode of diode 34.

The movable plate 26, in addition to being coupled to a junction of the current limiting resistors 30 and 32 is also connected to ground and by a lead 36 to an input terminal 37 of a low pass filter 38. The center tap 18, in a similar manner, is coupled by a lead 40 through a high frequency choke coil 42 to an input terminal 43 of the low pass filter 38. The low pass filter 38 includes output terminals 44 and 46 which act as output terminals for the transducer unit.

In operation, alternating current signals generated by the source 10 are applied to the transformer 14. Due to the center tapped arrangement of the secondary winding 16, A.C. voltage signals appear between the center tap 18 and the terminals 17 and 19 of the secondary winding 16, which are opposite in phase and equal in amplitude when the movable plate 26 is centrally disposed between the fixed plates 20 and 22. When the movable plate 26 is so disposed a balanced bridge circuit is formed comprising the center tapped secondary winding 16 and the differential capacitor 24.

With the movable plate centrally disposed between the fixed plates 20 and 22, equal voltage signals are developed therebetween and the voltage appearing at the center tap 18 is equal to the voltage appearing at the grounded movable plate 26.

Movement of the movable member 28 produces a movement of the movable plate 26 to change the capacitance of the differential capacitor thereby unbalancing the bridge circuit. A change in the relative capacitance between the fixed and movable plates of the differential capacitor 24 produces a difference in the A.C. voltage signal appearing between the terminals 17 and 19 of the secondary winding 16 and the center tap 18 resulting in a voltage signal at the center tap 18.

During alternate half cycles of the A.C. voltage signal in the secondary winding 16, the diodes 29 and 34 are forward biased. That is, when the voltage at the terminal 17 is positive relative to the voltage at the terminal 19, the diodes 29 and 34 switch to a forward conductive state to provide a low impedance path to current flow through the secondary winding 16. Current flow through the diodes 29 and 34 is limited by the current limiting resistors 30 and 32. Although the value of the current limiting resistors 30 and 32 is relatively high, being on the order of ten thousand ohms, the impedance thereof is small relative to the impedance presented by the differential capacitor 24. Accordingly, with the diodes 29 and 34 in a forward biased state, the differential capacitor 24 is effectively short circuited to prevent current flow therethhough.

Since the current limiting resistors 30 and 32 are coupled to ground, during the alternate half cycles of the alternating current signals in the secondary winding 16, a balanced bridge condition is again achieved irrespective of the unbalanced state of the differential capacitor 24. Thus, a voltage is developed at the center tap 18 only during alternate half cycles of the alternating current signal. In this manner the diodes 29 and 34 effect a demodulation of the voltage signal at the center tap 18 which is synchronous with the alternating current voltage signal in the secondary winding 16 as produced by the source 10.

The A.C. voltage signal developed at the center tap 18 is applied to the low pass filter through the high frequency choke 42 which prevents a shunting of the voltage by cable capacitance associated with the transducer unit. The low pass filter operates in a well known manner to develop a D.C. voltage signal which is directly proportional to the A.C. voltage at the center tap 18 thereby providing a signal which is directly indicative of changes in the capacitance of the differential capacitor 24 and hence displacement of the movable member 28.

FIGURE 2 represents an alternate embodiment of the present invention in which the A.C. voltage signal developed at the center tap 18 of the secondary winding 16 by an unbalance of the bridge circuit is synchronously demodulated by a switching means coupled in series between the center tap and the output terminals 44 and 46. In other respects the circuitry illustrated in FIGURE 2 is substantially as described in connection with FIGURE 1. Accordingly, only the essential differences therebetween and relating to the exemplary form of the switching means in series with the center tap 18 will be herein described.

As illustrated in FIGURE 2, the transformer 14, in addition to including a secondary winding 16, also includes a tertiary winding 48. The tertiary winding 48 is center tapped as illustrated at 50. The center tap 50 is coupled through the choke coil 42 to the low pass filter 38.

A terminal 51 of the tertiary winding 48 is coupled to the anode of a diode 52 which is, in turn, connected in series with a current limiting resistor 54 to the center tap 18. Similarly, a terminal 55 of the tertiary winding 48 is coupled in series with a current limiting resistor 56 to the center tap 18 of the secondary winding 16.

In operation, when the movable plate 26 is centrally disposed between the fixed plates 20 and 22 in the differential capacitor 24, a balanced bridge condition exists and no alternating current signal is developed between the center tap 18 and the movable plate 26. Movement of the movable member 28, however, produces movement of the movable plate 26 and unbalances the bridge by changing the capacitance between the fixed plate 20 and movable plate 26 and between the fixed plate 22 and the movable plate 26. The bridge unbalance results in an A.C. voltage signal at the center tap 18 of the secondary winding 16.

Due to the tertiary winding arrangement of the transformer 14', during consecutive half cycles of the alternating current signal developed by the source 10, the diodes 52 and 56 are simultaneously biased to a forward or high conductive state and to a reverse or low conductive state, respectively. Only during the alternate half cycles when the diodes are forward biased, however, does the alternating current voltage appearing at the center tap 18 effect a voltage signal at the center tap 50 of the tertiary winding 48. Thus, the center tapped tertiary winding 48, together with the diodes 52 and 56, as coupled to the center tap 18, operate as a switch element which opens and closes in synchronism with the source 10 to demodulate the voltage at the center tap 18. The demodulated voltage, appearing at the center tap 50 of the tertiary winding 48, is then applied through the high frequency choke coil 42 to the low pass filter 38, the low pass filter 38 developing a D.C. voltage signal between the output terminals 44 and 46 which is directly proportional to the displacement of the movable plate 26 from its central position and which hence is an accurate indication of the movement of the movable member 28.

What is claimed is:

1. A transducer circuit for detecting changes in a monitored condition, comprising:
    a normally balanced bridge circuit having a first pair of adjacent legs of equal impedance and a second pair of adjacent legs including a variable impedance element coupled to vary with changes in the monitored condition;
    signal generating means for developing alternating voltage signals across the legs of the first pair of legs, said voltage signals being of opposite phase and equal in amplitude when the legs of the second pair of legs are of equal impedance;
    first and second output terminals connected to a junction of the legs in the first and second pairs of legs, respectively, one of said output terminals being connected to ground reference potential;
    and means coupled to operate in synchronism with the alternating voltage signals developed by the signal generating means for demodulating the alternating voltage signals appearing at the other output terminal to develop a D.C. voltage between the output terminals which is proportional to the variations in the impedance of the variable impedance element.

2. The apparatus defined in claim 1 wherein the means for demodulating the alternating voltage signals includes a switching means coupled to open and close in synchronism with said signal generating means and connected in series with the other output terminal.

3. The apparatus defined in claim 1 wherein the means for demodulating the alternating voltage signals includes first and second switching means connected to open and close simultaneously and in synchronism with said signal generating means, the first switching means shunting a first leg of the second pair of legs and the second switching means shunting a second leg of the second pair of legs.

4. The apparatus defined in claim 3 wherein the first and second switching means includes first and second diodes, respectively, the cathode of the first diode being coupled to the anode of the second diode.

5. A transducer circuit for detecting changes in a monitored condition, comprising:
   a normally balanced bridge circuit including first and second impedance elements, the impedance elements being connected in series and being of equal value, and a differential capacitor having first and second fixed plates and a central movable plate, the first impedance element being coupled to the first fixed plate and the second impedance element being coupled to the second fixed plate;
   signal generating means for developing alternating voltage signals across the first and second impedance elements, said voltage signals being opposite in phase and equal in amplitude when the movable plate is centrally disposed between the first and second fixed plate;
   first and second output terminals coupled to a junction of the first and second impedance elements and the movable plate, respectively;
   and means coupled to operate in synchronism with the alternating voltage signals developed by the signal generating means for demodulating the alternating voltage signals appearing at the other output terminal to develop a D.C. voltage signal between the output terminals which is proportional in magnitude to movement of the movable plate.

6. The apparatus defined in claim 5 wherein the means for demodulating alternating voltage signals includes a switching means coupled to open and close in synchronism with the signal generating means and connected in series with the other output terminal.

7. The apparatus defined in claim 5 wherein the means for demodulating alternating voltage signals includes first and second switching means connected to open and close simultaneously and in synchronism with the signal generating means, the first switching means being coupled between the first fixed plate and the movable plate and the second switching means being coupled between the movable plate and the second fixed plate.

8. The apparatus defined in claim 7 wherein the first and second switching means include first and second diodes, respectivel, said diodes being coupled for series current flow.

9. A transducer for detecting changes in a monitored condition, comprising:
   a source of alternating current signals;
   a transformer having its primary winding coupled to the source of alternating current signals and having a center tapped secondary winding;
   a differential capacitor having first and second fixed plates coupled to opposite terminals of the secondary winding and a movable plate centrally disposed between the first and second fixed plates;
   first and second output terminals coupled to the center tap and the movable plate, respectively, one of said output terminals being connected to ground reference potential;
   and means responsive to said source of alternating current signals for demodulating alternating current signals at the other output terminal to develop a direct current signal between the output terminals which is proportional in magnitude to movement of the movable plate.

10. The apparatus defined in claim 9 wherein the means for demodulating alternating current signals includes a switching means coupled in series with the other output terminal for opening and closing in response to the source of alternating current signals.

11. The apparatus defined in claim 9 wherein the means for demodulating alternating current signals includes first and second switching means for opening and closing simultaneously in response to the source of alternating current signals, the first switching means being connected between the first fixed plate and the movable plate and the second switching means being connected between the movable plate and the second fixed plate.

12. The apparatus defined in claim 11 wherein the first and second switching means include first and second diodes, respectively, the cathode of the first diode being connected to the anode of the second diode.

References Cited by the Examiner

UNITED STATES PATENTS

| | | | |
|---|---|---|---|
| 2,132,183 | 10/1938 | Oakley | 340—200 |
| 2,244,799 | 6/1941 | Paddle | 329—204 X |
| 2,548,790 | 4/1951 | Higinbotham et al. | 340—200 |
| 2,661,455 | 12/1953 | Tickner | 323—75 X |
| 2,727,999 | 12/1955 | Rusler | 307—43 |
| 2,790,898 | 4/1957 | Bady | 329—204 X |
| 2,919,404 | 12/1959 | Rock | 324—83 |
| 2,943,271 | 6/1960 | Willis | 329—204 X |
| 3,077,588 | 2/1963 | Revesz et al. | 340—200 X |

FOREIGN PATENTS

| | | |
|---|---|---|
| 888,133 | 10/1952 | Germany. |
| 1,069,284 | 11/1959 | Germany. |

JOHN F. COUCH, *Primary Examiner.*

LLOYD McCOLLUM, *Examiner.*

A. J. GAJARSA, W. E. RAY, *Assistant Examiners.*

UNITED STATES PATENT OFFICE
CERTIFICATE OF CORRECTION

Patent No. 3,278,919             October 11, 1966

Lawrence T. Fleming

It is hereby certified that error appears in the above numbered patent requiring correction and that the said Letters Patent should read as corrected below.

In the heading to the printed specification, lines 3 to 5, strike out "assignor to Consolidated Electrodynamics Corporation Pasadena, Calif., a corporation of California" and insert instead -- assignor, by mesne assignments, to Bell & Howell Company, Chicago, Ill., a corporation of Illinois Signed and sealed this 5th day of September 1967.

(SEAL)
Attest:

ERNEST W. SWIDER             EDWARD J. BRENNER
Attesting Officer             Commissioner of Patents